United States Patent

Sasuta et al.

Patent Number: 6,134,446
Date of Patent: Oct. 17, 2000

[54] METHOD AND APPARATUS FOR SUBSCRIBER UNIT LOCATION UPDATING

[75] Inventors: Michael D. Sasuta, Mundelein; Kamala D. Urs, Bartlett; Mark L. Shaughnessy, Algonquin, all of Ill.

[73] Assignee: Motorola, Inc., Schaumburg, Ill.

[21] Appl. No.: 08/988,154

[22] Filed: Dec. 10, 1997

[51] Int. Cl.[7] .................................................. H04Q 7/20
[52] U.S. Cl. .................... 455/456; 455/432; 455/435; 455/517; 455/552
[58] Field of Search .................................. 455/432, 433, 455/435, 456, 515, 525, 67.1, 550, 551, 552, 422, 434, 517

[56] References Cited

U.S. PATENT DOCUMENTS

| | | | |
|---|---|---|---|
| 5,642,398 | 6/1997 | Tiedemann, Jr. et al. | 455/435 |
| 5,862,483 | 1/1999 | Fletcher et al. | 455/435 |
| 5,884,172 | 3/1999 | Sawyer | 455/435 |
| 5,901,352 | 5/1999 | St.-Pierre | 455/433 |

*Primary Examiner*—Reinhard J. Eisenzopf
*Assistant Examiner*—Lester G. Kincaid
*Attorney, Agent, or Firm*—Steven R. Santema

[57] ABSTRACT

A mobility processor (34) provides location update parameters to a subscriber unit (SU1–4). The location update parameters indicate conditions upon which the subscriber unit is to provide its location information to the mobility processor. From the location information, the mobility processor determines whether the subscriber unit has provided the location information in a manner that is consistent with the location update parameters. If the mobility processor determines that the subscriber unit did not provide the location information in a manner that is consistent with the location update parameters, the mobility processor generates a new set of location update parameters which are provided to the subscriber unit.

24 Claims, 7 Drawing Sheets

METHOD AND APPARATUS FOR SUBSCRIBER UNIT LOCATION UPDATING

TECHNICAL FIELD OF THE INVENTION

The present invention relates generally to communication systems and more particularly to subscriber unit location updating within wireless communication systems.

BACKGROUND OF THE INVENTION

Communication systems are known to include a plurality of communication devices that communicate with each other via supporting infrastructure. Each communication device has an individual access code that distinguishes it from the other communication devices. Based on the individual access code, the supporting infrastructure can individually process the requests of the communication devices. In a typical wireless communication system, a communication device can request a plurality of services that include cellular telephony services (e.g., call-waiting, call-forwarding, three-way calling, etc.), land mobile communications services (i.e., one to many communications), and dispatched communications services (i.e., a dispatcher communicating with an individual communication device and/or group of communication devices).

In the typical wireless communication system, a communication device (or subscriber unit) is a cellular telephone, a mobile radio, a portable radio, a personal digital assistant ("PDA"), a personal computer equipped with a wireless modem, or any combination thereof. The supporting infrastructure includes a plurality of base stations, groups of which are coupled to a base station controller. In turn, groups of base station controllers are coupled to service processors, which are coupled to a public switched telephone network ("PSTN"). The service processors may be mobile switching centers, dispatch service processors, or mobile data gateways. When communication devices are located in communication areas that include a mobile switching center, a dispatch service processor, and a mobile data gateway, the devices have access to group communications services, private communications services, telephony services, dispatch services, and/or data transfer services.

The typical wireless communication system also includes at least one home location register ("HLR") and a plurality of visitor location registers ("VLR"). Typically, a service processor is coupled to one or more VLRs. The HLR contains communication device profiles for each communication device affiliated with the wireless communication system. The communication device profile includes information relating to a communication device's identity, system access privileges, subscribed services, communication device location, etc. Each of the VLRs contains communication device profiles, but only for the communication devices that the associated service processor services and only for the services it supports (i.e., the services supported by the associated service processor(s)).

When the profile of the communication device changes (i.e., the communication device has changed its location or has changed its subscribed to services), the communication device profile change needs to be communicated to the appropriate VLRs (i.e., the VLRs associated with the service processors that are servicing the communication device) and the HLR. To update the communication device profile in the typical wireless communication system, the communication device would need to register with each service processor that provides it a service. The registering was done on an individual basis and was done even if the same service processor services the new area that the communication device has relocated to. Thus, if the communication device has a dozen desired services, the communication device would need to register with a dozen service processors, even if the service processors were the same as the ones the communication device was registered with before the communication device profile change. The communication device was also required to attempt to register with a service processor in a communication area that did not offer the desired service. In response to the attempt to register, the communication device would receive a non-service grant message. Further, multiple services could be supported in one area, and sometimes the smallest denominator for necessary location is a ten cell region, a hundred cell region, or on a cell-by-cell region. As can be deduced, this type of registration in response to a profile change consumes bandwidth of the system, thereby reducing the overall efficiency of the system. The bandwidth consumption is even greater in large communication systems, where thousands of communication devices are regularly changing their profiles.

As an alternative method for providing updated communication device profiles to the VLRs, the communication device communicates the changes in its profile to the HLR. The HLR then individually informs each of the VLRs associated with service processors that are to provide services for the communication device, even if the service processors were already providing their service to the communication device before it relocated and even if the subscriber unit had no desire to use the service. The HLR identifies the VLRs based on the communication device's subscribed to services, which are established at the system administration level. As such, the communication device has no choice but to take the services known by the HLR and provide location update information therefor. In other words, the subscribed to services that the HLR has stored for the communication device are the services the communication device will receive, providing, of course, that the communication area supports such services. Thus, the user of the communication device has no flexibility as to the services it can and cannot access.

Therefore, a need exists for a method and apparatus that provides the operators of communication devices the flexibility to change the desired services it will access and reduce the bandwidth requirements for updating changes of the communication device profile to VLRs.

DETAILED DESCRIPTION OF A PREFERRED EMBODIMENT

Generally, the present invention provides a method and apparatus for providing location information of subscriber units to a mobility processor and to service processors. This is accomplished by having the mobility processor provide location update parameters to a subscriber unit. When the location update parameters indicate that the subscriber unit is to provide its location information, the subscriber unit does so. The location information identifies the particular communication area of a communication system in which the subscriber unit is located. From this information, the mobility processor determines whether the subscriber unit has provided the location information in a manner that is consistent with the location update parameters. The location update parameters are established based on which of the subscribed to services the communication device desires to access (desired services) and the service capabilities of the area in which the communication device is located. For example, if the communication device is only accessing one service and the service is supported in multiple communication areas in the communication system accessible by the communication device, the update location parameters would indicate that the communication device would supply the mobility processor with its location information when the communication device left the communication areas supporting the service, at a given time interval, or some combination thereof.

If the mobility processor determines that the subscriber unit did not provide the location information in a manner that is consistent with the location update parameters, the mobility processor generates a new set of location update parameters which are provided to the subscriber unit. The manner would be inconsistent if the subscriber unit changed its location requiring affiliation with a new service processor or changed its desired services. In addition to verifying whether the location information was received in a consistent manner with the location parameters, the mobility processor stores the location information in a service independent format, i.e., a format which is consistent with the storage format of the mobility processor. For example, the location information may be stored as latitude and longitude coordinates, relative location, polar coordinates, etc.

When the mobility processor detects that the subscriber unit has changed location or changed its desired services, it updates the location parameters, but does not inform the service processors until a request is received and subsequently terminated due to performance or other termination mechanism. A service processor, in response to receiving a service request for the subscriber unit, will provide current location information request to the mobility processor. At this time, the mobility processor provides, in a service dependent format, the location information to the requesting service processor, where the service dependent format is a storage format of location information that is consistent with the storage format of the service processor. With such a method and apparatus, the present invention reduces the data traffic within a communication system by providing location update information only when needed. The present method and apparatus also enables a subscriber unit to select which of its subscribed to services it desires to access, thus putting more control in the hands of the subscriber unit operator.

Figure 1:
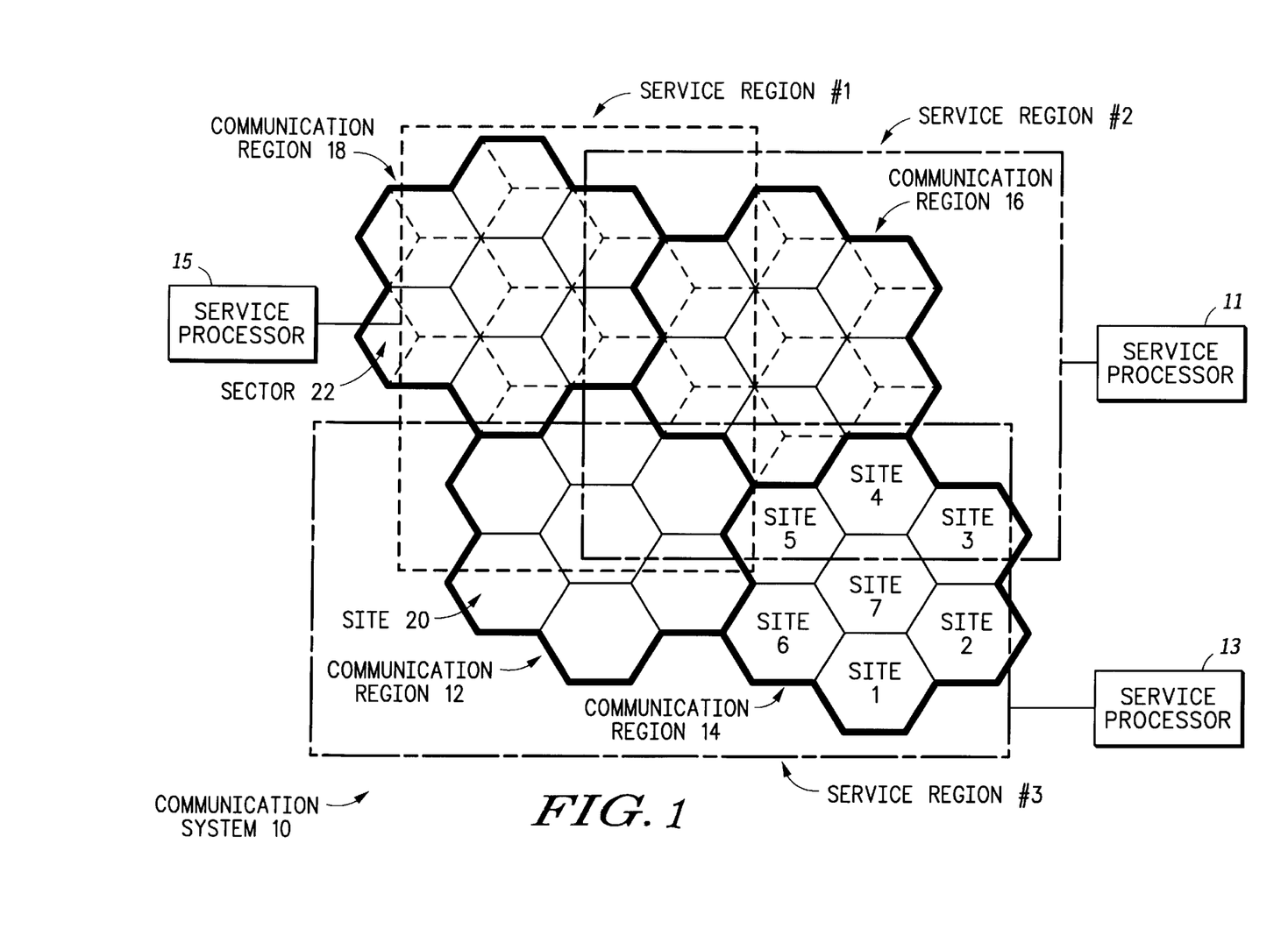
FIG. 1 illustrates a graphical representation of a communication system having a plurality of communication areas in accordance with the present invention.

The present invention can be more fully described with reference to FIGS. 1 through 9. FIG. 1 illustrates a graphical representation of a communication system 10 that includes a plurality of communication regions 12, 14, 16, and 18 and a plurality of overlaying service regions #1, #2 and #3. The first service region is delineated by the heavy dotted line, the second service region by the heavy dashed line, and the third service region by the heavy dotted and dashed lines. The communication regions 12, 14, 16, and 18 each include a plurality of sites 20, which are arranged in a seven site re-use pattern. The geographic boundaries of the sites 20 are established based on coverage area of the sites. For a typically cellular system, the coverage area of a site is approximately a mile in diameter, but may range from a few hundred feet for micro-cell systems to tens of miles for land mobile systems. As shown, communication regions 16 and 18 each have their sites 20 divided into three sectors 22. The sectors 22 are delineated by the thin dotted lines. As one of average skill in the art will readily appreciate, dividing sites into sectors allows for increased frequency re-use, thereby enabling the communication system 10 to support more subscriber units per geographic area.

Each of the service regions #1, #2, and #3, is operably coupled to a service processor 15, 11 and 13, respectively. The service processors 11, 13, and 15 may be, for example, mobility switching centers ("MSC") for GSM telephony services, MSC for CDMA (code division multiple access) telephony services, MSC for any other type of wireless telephony services, mobile data gateways, dispatched service processors, video service processors, multimedia service processors, data packet service processors, and/or general telephony service processors. While only one service processor is shown coupled to each service region #1, #2, #3, it should be apparent to one of average skill in the art that multiple service processors may provide services in the service regions. Note that the service regions are shown as rectangular shapes, but could be of any shaped established by any boundary means. Further note that the service regions may alternatively be established based on the geographic layout of the communication system 10. For example, a service region may be established as an individual, or grouping of, communication regions 12, 14, 16, and 18, of sites 20, and/or of sectors 22.

The service processors 11, 13, 15 provide services for a subscriber unit located within the corresponding service region #1, #2, or #3, provided the subscriber unit is authorized to access the service and has selected it as one of its desired services. For example, if the subscriber unit is located within service region #1 and the service processor 15 is an MSC for GSM telephony services, the service processor 15 would process inbound and outbound GSM wireless telephone calls made by the subscriber unit. As long as the subscriber unit remained in service region #1, the service processor 15 would provide GSM services for the subscriber unit.

Figure 2:
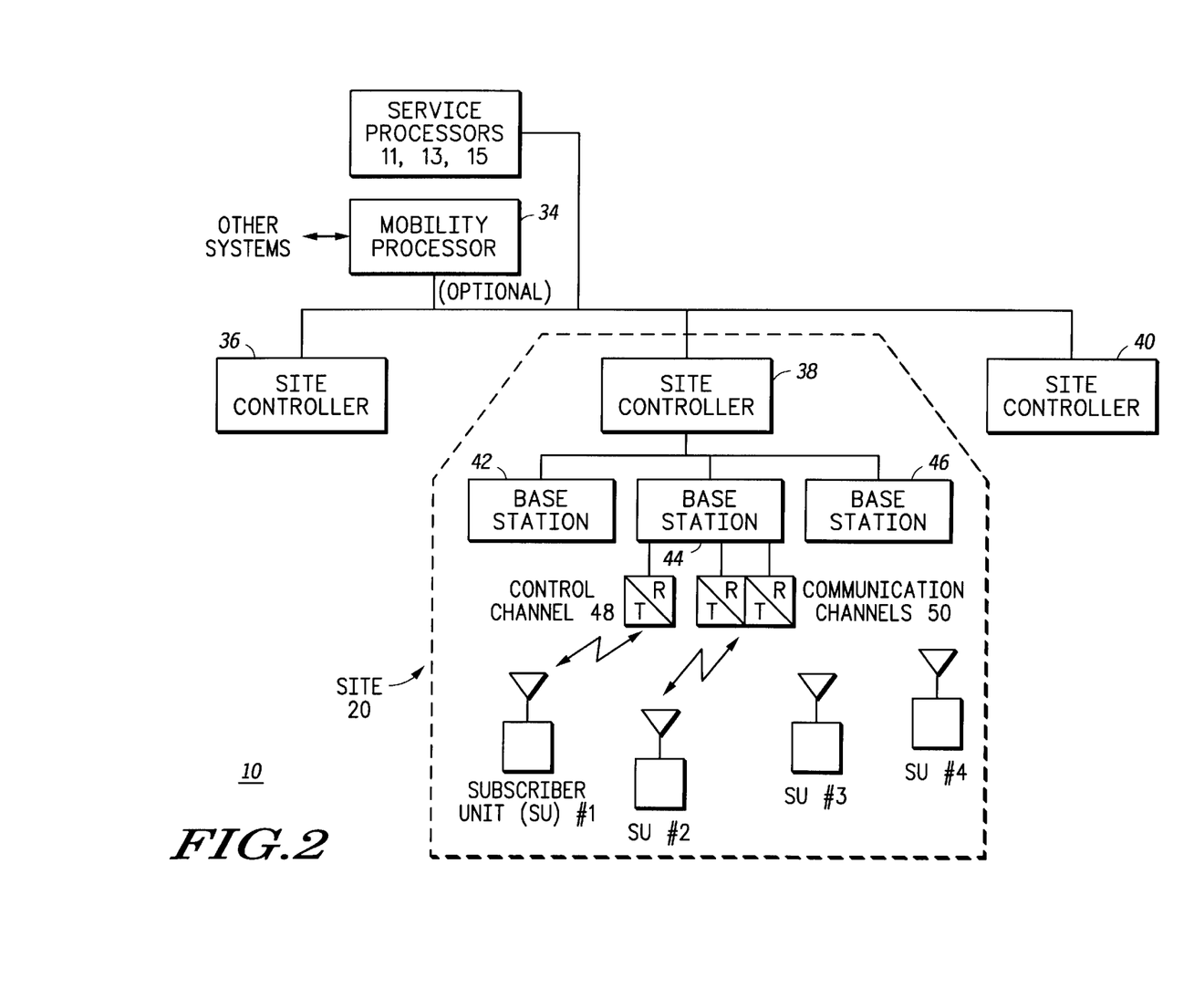
FIG. 2 illustrates a graphical representation of a communication site of the communication system of FIG. 1.

FIG. 2 illustrates a schematic block diagram of a communication site 20 in greater detail. The site 20 includes a plurality of base stations 42, 44, 46, a control channel 48, a plurality of communication channels 50, and a plurality of subscriber units SU #1–4. The mobility processor 34 is coupled to the service processors 11, 13, 15, and other systems. The mobility processor 34 is a stand-alone personal computer, a workstation, a main frame computer, or similar device. The structure of the mobility processor 34 will be discussed in greater detail with reference to FIG. 3.

When a subscriber unit desires to access a service (for example, place a telephone call), the subscriber unit transmits an inbound signaling word (ISW) over the control channel. The ISW identifies the requesting subscriber unit and the requested service. The base station forwards the ISW to the site controller 38. The site controller 38 determines if the subscriber unit is authorized to access the requested service by accessing the HLR, or an affiliated VLR directly, or indirectly via the mobility processor 34 and/or the service processors 11, 13, 15. If the requested service is authorized (i.e., the subscriber unit has subscribed to the service and has selected it as a desired service), the site controller 38 determines which service processor 11, 13 15 will process the subscriber unit's request. If the subscriber unit is a target of a service (e.g., is receiving a call), the service processor 11, 13, 15 informs the site controller 38 that a subscriber unit is a target of a service. The site controller 38 generates an outbound signaling word (OSW), which the subscriber unit receives via the control channel. The OSW identifies the subscriber unit, the service, and provides instructions on how to receive the service (E.g., affiliate with one of the communication channels for an incoming call).

The above described process of initiating a service and being a target of a service assumed that the location information of the subscriber unit was received by the mobility processor 34 in manner that was consistent with location parameters. When the subscriber unit relocates into a particular site, or changes its desired services, the mobility processor 34 needs to be updated. The mobility processor 34 provides the subscriber unit with location update parameters, which tell the subscriber unit how often to provide its location information to the mobility processor 34. As an optional addition, the location update parameters instruct the subscriber unit to provide its location and desired services at periodic intervals, when its location changes, or when its desired services change. For example, if a subscriber unit were located in site 1 of communication region 14 (of FIG. 1), the only service available is the one supported by service processor 13. As long as the subscriber unit remained in sites 1, 2, or 6, the location update parameters would instruct the subscriber unit to provide its location information infrequently. But when the subscriber unit relocates to sites 3, 4, 5, or 7, the location update parameters would be updated to instruct the subscriber unit to provide its location information more frequently to detect when the subscriber unit was in the service region #2, which is supported by service processor 11 and/or by service processor 13. With the subscriber unit located in service region #2, the mobility processor stores its new location but does not immediately update the service processor 11 of the subscriber unit's new location.

The mobility processor will notify the service processor 11 when the service processor 11 requests the location information of the subscriber unit. The service processor 11 makes the request when it receives information that the subscriber unit is a target for a particular service and does not have the subscriber unit's location information in its associated VLR or does not have an associated VLR (for location only). Once the service processor's 11 VLR is updated with the location information of the subscriber unit, the service processor processes the service. Updating of the service processors with the location information will be discussed in greater detail below with reference to FIG. 4 through 9.

Figure 3:
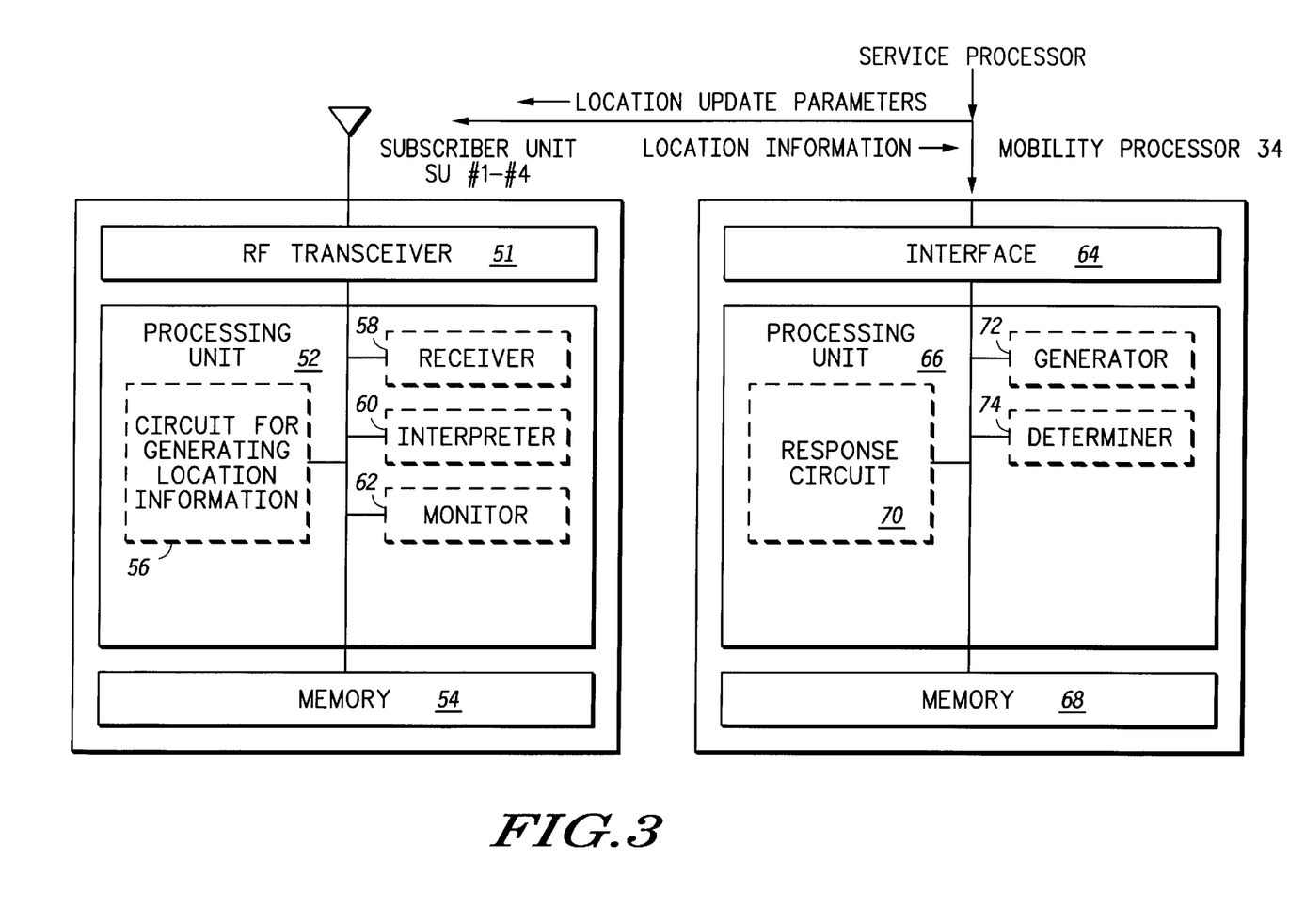
FIG. 3 illustrates a schematic block diagram of a subscriber unit and mobility processor in accordance with the present invention.

FIG. 3 illustrates a schematic block diagram of a subscriber unit #1–4 and a mobility processor 34. The subscriber unit includes an RF (radio frequency) transceiver 51, a processing unit 52, and memory 54. The processing unit 52, which is a microprocessor, micro-controller, digital signal processor, microcomputer, or any other device that processes digital information based on programming instructions, performs the programming instructions stored in memory 54. The memory 54 is read-only memory (ROM), random access memory (RAM), electronically programmable read-only memory, floppy disk memory, hard disk memory, DVD memory, CD memory, or any other means for storing digital information. Note that the interface 64 may be an RF transceiver if the transmission path is an RF transmission path or a wireline interface such as a TCP-IP interface, a network interface, an Internet interface, or any other data packet interface.

Based on programming instructions stored in memory 54, the processing unit functions as a circuit 58 for receiving location update parameters from the monitoring entity. The processing unit 52, based on additional programming instructions, functions as circuit 60 to interpret the location update parameters to ascertain at least one condition for providing location information to the mobility processor. Further programming instructions cause the processing unit to function as a circuit 62 for monitoring for when the at least one condition occurs. The memory 54 includes programming instructions that cause the processing unit to function as a circuit 56 for generating location information. The particular functionality of the receiver 58, the interpreter 60, the monitor 62 and the circuit for generating location information 56 will be discussed in greater detail with reference to FIG. 5 and FIG. 9.

The mobility processor 34, which is functionally equivalent to a home location register that is dedicated for location information of subscriber units, includes an interface 64, a processing unit 66, and memory 68. The processing unit 66, which is a microprocessor, micro-controller, digital signal processor, microcomputer, or any other device that processes digital information based on programming instructions, performs the programming instructions stored in memory 68. The memory 68 is read-only memory (ROM), random access memory (RAM), electronically programmable read-only memory, floppy disk memory, hard disk memory, DVD memory, CD memory, or any other means for storing digital information.

The memory 68 stores programming instructions which, when read by the processing unit 66, cause the processing unit 66 to function as a generator 72, a determiner 74, and a response circuit 70. While functioning as the response circuit 70, the processing unit 66 responds to location information requests from service processors. While functioning as the generator 72, the processing unit generates a location response based on the location information, wherein the location response is in a service-dependent formation of the requesting service processor. Alternatively, the processing unit 66, while functioning as the generator 72, generates location update parameters, which are sent to subscriber units. When functioning as the determiner 74, the processing unit determines whether the location information received from the subscriber units was received in a manner that was consistent with the location update parameters. The functionality of response circuit 70, generator 72, and determiner 74 will be discussed in greater detail with reference to FIG. 5 through 8.

Figure 4:
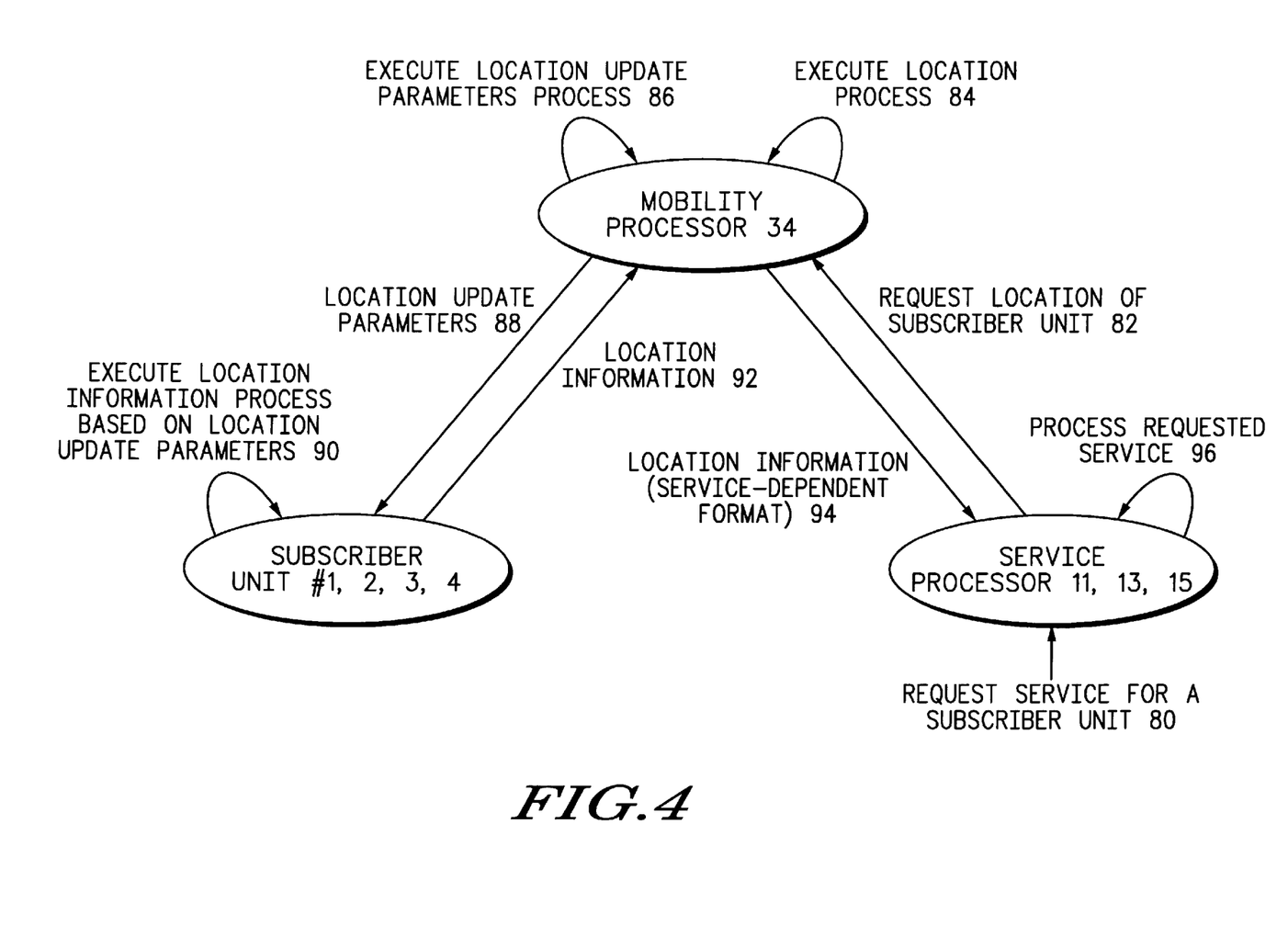
FIG. 4 illustrates a state diagram illustrating the updating of location information of subscriber units and associated services in accordance with the present invention.

FIG. 4 illustrates a state diagram for processing location information of a subscriber unit. The service processor 11, 13, 15 remains in an idle state, with respect to processing location information, until it receives a request 80 to process a service for a subscriber unit. When the request is received, the service processor attempts to process the requested service 96. If the service processor, in its associated VLR, is storing the communication profile of the subscriber unit, then the service processor completes the processing of the request 96. If, however, the service processor does not have the communication profile of the subscriber unit, the service processor provides a request 82 for the location of the subscriber unit #1, #2, #3, #4, to the mobility processor 34.

Upon receiving the location request 82, the mobility processor executes a location process 84. The first part of the location process 84 is to determine whether the mobility processor has a record of the subscriber unit. If not, the process is complete and the mobility processor 34 sends a rejection message to the service processor 11, 13, 15 or performs a mobility recovery procedure. If the mobility processor has a record for the subscriber unit, it converts the location information from a service independent format to a service dependent format. The mobility processor sends the location information 94, in the service dependent format, to the service processor such that it may process the request 96.

The mobility processor 34 stores the location information in a service independent format, which is based on the storage format of the mobility processor. For example, the storage format may store the location information as longitude and latitude coordinates, as polar coordinates, etc. The service dependent format of a service processor is based on the location information storage format and/or protocol of the service processors. For example, if the service processor is an MSC for GSM communications, the format in which the information needs to be received has to be compatible with the GSM standard protocol. The conversion from the service independent format to the service dependent format will be discussed in greater detail with reference to FIG. 6 and 7.

In addition to processing location requests from the service processors, the mobility processor 34 executes a location update parameter process 86. This process causes the mobility processor to provide location update parameters 88 to the subscriber unit. The location update parameters inform the subscriber unit of conditions when it is to provide its location information to the mobility processor. The conditions are dependent upon the desired services of the subscriber unit, the service capabilities of the particular communication area that the subscriber unit is located, and changes made to either the desired services or the service capabilities of the communication area.

Upon receiving the location update parameters, the subscriber unit executes a location information process 90. The location information process 90 causes the subscriber unit to ascertain conditions as to when it is supposed to provide its location information to the mobility processor 34. When the condition occurs, the subscriber unit provides its location information 92 to the mobility processor 34. The location information indicates the communication area that the subscriber unit is located. The communication area is defined as a communication sector, a communication site, a communication region, or a geographic area based on latitudinal and longitudinal coordinates. By providing location information in this manner, subscriber units are only providing their location information based on a variable condition, which varies based on the service capabilities of the area that the unit is located and the desired services. As such, the service processors are only being updated with the location information when they need to be updated. The mobility processor stores the location information in a format that is most convenient for it, which reduces the data overhead of the communication system, thereby making the system more efficient.

Figure 5:
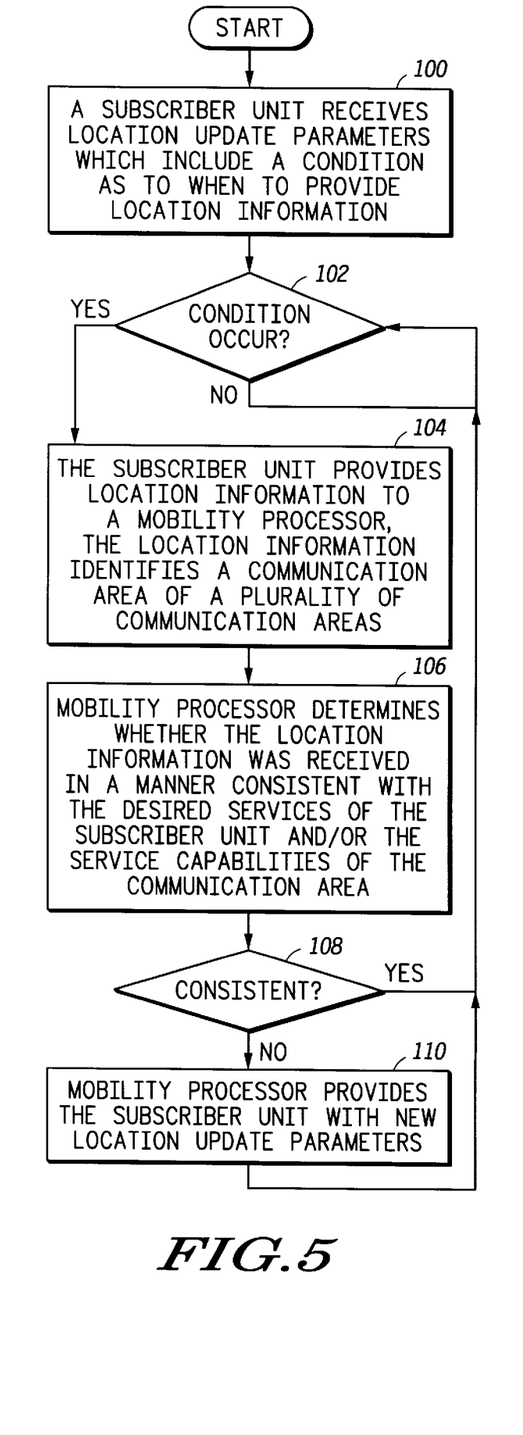
FIG. 5 illustrates a flow chart of a method for updating a subscriber unit's location information in accordance with the present invention.

FIG. 5 illustrates a flow chart that illustrates a method for updating subscriber unit location information. The process begins at step 100 where a subscriber unit receives location update parameters from a mobility processor. The location update parameters include a condition as to when the subscriber unit is to provide its location information back to the mobility processor. The location update parameters may be provided as initialization location update parameters when the subscriber unit registers with the communication system. In other words, when the subscriber unit registers with the communication system, it receives an initial set of location update parameters.

The process then proceeds to step 102 where a determination is made by the subscriber unit as to whether the particular condition has occurred. The particular condition occurs at the expiration of a periodic interval, when the subscriber unit moves into another communication area, when the subscriber unit has moved from one set of communication areas to another set of communication areas, or when the subscriber unit changes its desired services. The condition is established based on the desired services, and the service capabilities of the particular communication area that the subscriber unit is located in. For example, when the subscriber unit is located in a region supporting several services, where one of the services requires precise location information, the location information would need to be provided at a more frequent rate.

If the condition has not occurred, the subscriber unit waits for the condition to occur or to receive a new set of location update parameters. If, however, the condition has occurred, the process proceeds to step 104 where the subscriber unit provides its location information to the mobility processor. The location information identifies the particular subscriber unit and the communication area that it is located in. The process then proceeds to step 106 where the mobility processor determines whether the location information was received in a manner consistent with the desired services of the subscriber unit and/or the service capabilities of the communication area. In other words, the mobility processor determines the consistency of the transmission of the location information based on a change occurring to at least one of the desired services, the service capabilities of the communication area, or when the subscriber unit has relocated to the communication area from another communication. If the subscriber unit has relocated from another communication area, the condition would be met only if the another communication area offers different services than the current communication area and the difference impacts the location rate.

The process then proceeds to step 108 where a determination is made as to whether the information was provided in a consistent manner. If so, the process returns to step 102 where the subscriber unit waits for the condition to occur again or to receive new location update parameters. If, however, the location information was not received in a consistent manner, the process proceeds to step 110. At step 110, the mobility processor provides the subscriber unit with new location update parameters. The new location update parameters includes a new condition upon which the subscriber unit is to provide its location information.

The preceding discussion of FIG. 5 focused on a process for obtaining location information from an individual subscriber unit. As one of average skill in the art will readily appreciate, the process is expandable to include a plurality of subscriber units that are arranged into a particular group wherein the group receives group location update parameters. As such, each subscriber unit within the group would provide its location information to the mobility processor based on the group location update parameters. The mobility processor would generate and provide new group location update parameters to the subscriber units when the location information for any member, a certain number, or designated members of the group was received in a manner inconsistent with the group location update parameters.

Figure 6:
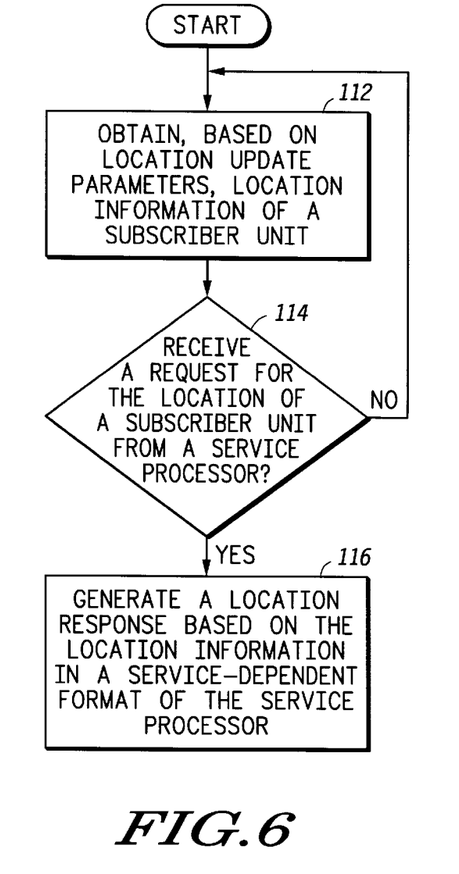
FIG. 6 illustrates a flow chart of a method for providing location information to a service processor in accordance with the present invention.

FIG. 6 illustrates a flowchart of a method for the mobility processor to provide location information of a subscriber unit to a service processor. The process begins at step 110 where the mobility processor obtains, based on location update parameters, location information of the subscriber unit. The mobility processor obtains the information directly from the subscriber units via an RF transmission path, or indirectly via the site controller. The process then proceeds to step 112 where a determination is made as to whether the mobility processor received a request for location information of the subscriber unit from a service processor. If not, the process reverts back to step 110 where the process continues to update the location information of the subscriber unit until a request is received.

When a request is received, the process proceeds to step 114 where the mobility processor generates a location response based on the location information. The location response is in a service dependent format of the service processor. As previously mentioned, the service processor may be an MSC for any wireless telephony services, a mobile data gateway, a dispatched service processor, a video service processor, etc. Each of the service processors has a unique protocol, and information storage format, wherein messages to and from the service processors have to be in the correct format. Thus, the mobility processor has to convert the location information of the subscriber unit into the particular format of the service processors. By processing location information updates in this manner, the amount of data traffic within the communication system is dramatically reduced. The reduction occurs because a subscriber unit only provides its location information based on the location update parameters and the service processors are only provided with the information when needed. In addition, the mobility processor provides the location information updates of the subscriber unit to service processors in a single message in a service dependent format.

Figure 7:
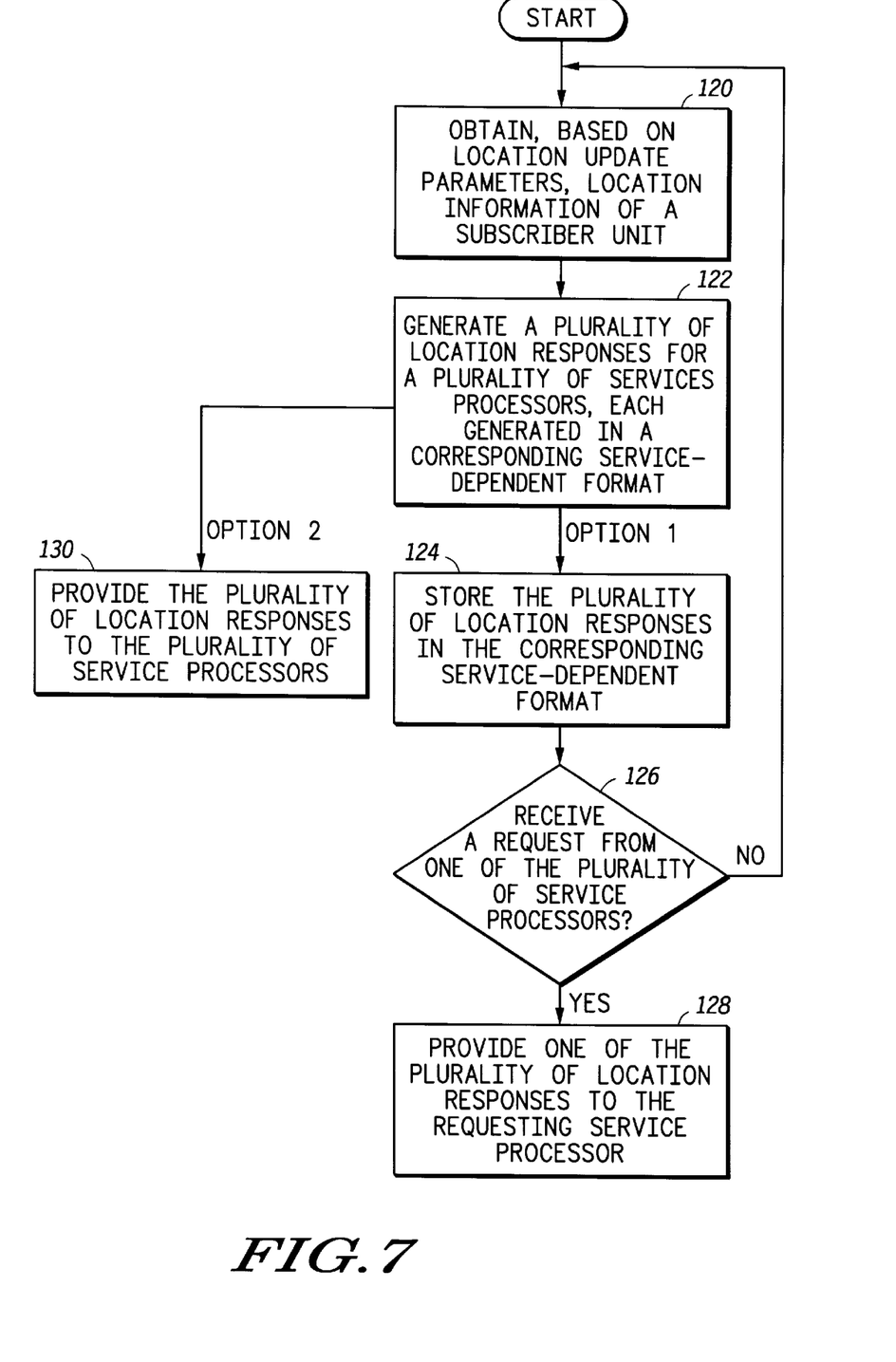
FIG. 7 illustrates a flow chart of a method for a mobility processor to provide updated location information of a subscriber unit to a service processor in accordance with the present invention.

FIG. 7 illustrates a flow chart of a method for a mobility processor to provide updated location information to a service processor. The process begins at step 120 where the mobility processor obtains, based on location update parameters, location information from the subscriber unit. The process then proceeds to step 122 where the mobility processor generates a plurality of location responses for a plurality of service processors. Each of the plurality of location responses is generated in a corresponding service dependent format. In other words, for each service processor with which the subscriber unit is affiliated, the mobility processor will generate a location response formatted in the particular protocol of the service processor.

At this point, the mobility processor provides the service dependent formatted location responses to the service processors in one of two methods. In option 1, the mobility processor stores the plurality of location responses in the corresponding service dependent format. The process would then proceed to step 126 where the mobility processor would determine whether it has received a request from one of the plurality of service processors. If not, the process reverts to step 120. If, however, the mobility processor has received a request from a service processor, the process proceeds to step 128. At step 128, the mobility processor provides one of the plurality of location responses that corresponds to the requesting service processor to the service processor.

A second option is for the mobility processor, after it has generated the location responses, to provide the plurality of location parameters to the service processors, which is done at step 130. In this approach, the service processors do not have to request the information, which reduces data overhead. But some of the service processors may not use the information, thereby wasting the transmission to them. Which option to chose is dependent on the needs of the subscriber units. If subscriber units are regularly accessing their desired services, the second option is more efficient. If, however, the subscriber units access their desired services infrequently, the first option is more efficient.

Figure 8:
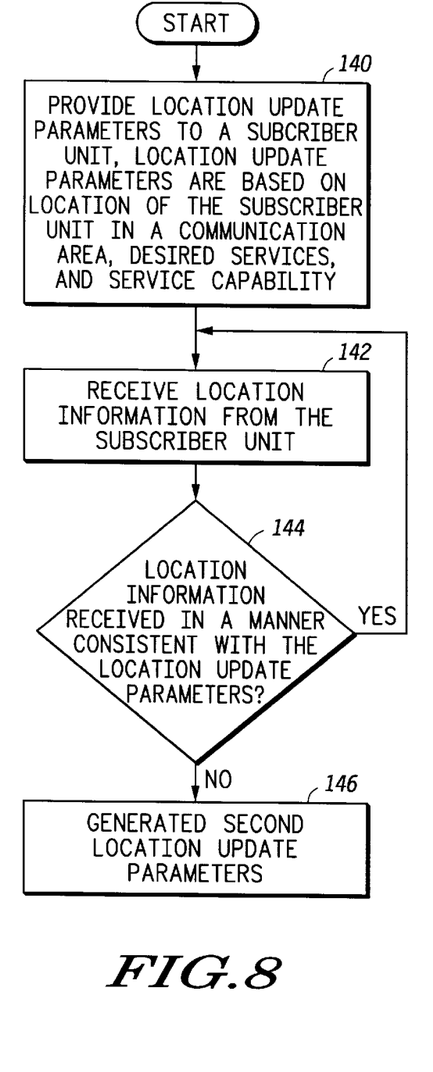
FIG. 8 illustrates a flow chart of a method for a mobility processor to provide location update parameters to a subscriber unit in accordance with the present invention.

FIG. 8 illustrates a flow chart of a method for generating new location update parameters by a mobility processor. The process begins at step 140 where the location update parameters are provided to a subscriber unit. The location update parameters are based on location of the subscriber unit in a particular communication area, the desired services, and the service capabilities of the particular communication area. The process then proceeds to step 142 where the mobility processor receives location information from the subscriber unit.

The process proceeds to step 144 where the mobility processor determines whether the location information was received in a manner consistent with the location update parameters. If so, the process reverts back to step 142. If not, the process proceeds to step 146, where the mobility processor generates second location update parameters. The mobility processor determines whether the location information was received in a consistent manner with the location update parameters in a variety of ways. For example, the manner could be inconsistent when the location information indicates that the subscriber unit is located in another communication area and the another communication area has different service capabilities than the communication area that the location update parameters were created for. As another example, the manner is inconsistent when the service capabilities of the communication area change. As yet another example, the manner is inconsistent when the desired services of the subscriber unit have changed. As still another example, the manner is inconsistent when the subscriber unit has moved from one set of communication areas to another set of communication areas.

The new location update parameters generated by the mobility processor may inform the subscriber unit to provide its location information more frequently, less frequently, or not at all. For example, if the subscriber unit relocated into a region of the communication system where none of its desired services were offered, the subscriber unit would not have to provide its location information until it moved into a region where its services are offered.

Figure 9:
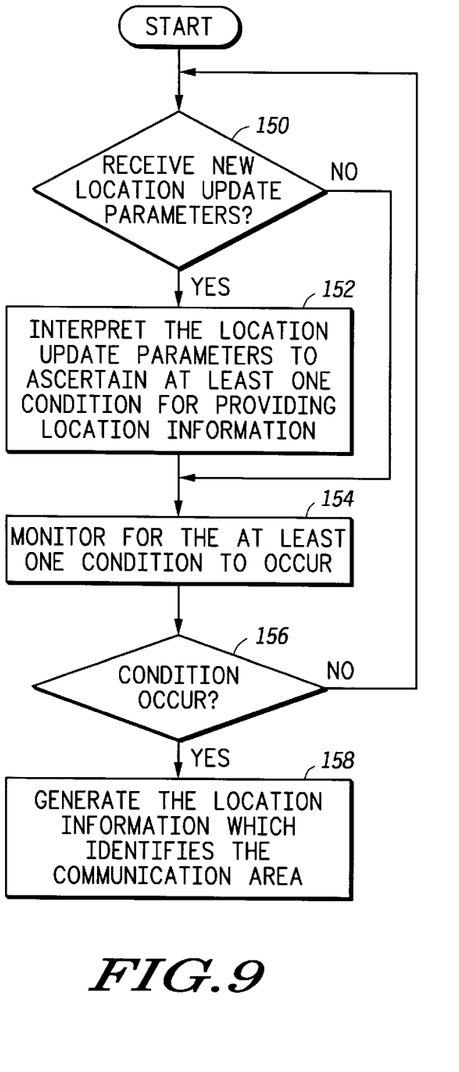
FIG. 9 illustrates a flow chart of a method for a subscriber unit to provide location information to a mobility processor in accordance with the present invention.

FIG. 9 illustrates a flow chart of a method for the subscriber unit to provide its location information. The process begins at step 150 where the subscriber unit determines whether new location update parameters have been received. If so, the process proceeds to step 152 where the subscriber unit interprets the location update parameters to ascertain at least one condition for providing location information. The condition may be expiration of a periodic interval, movement into another communication area of the plurality of communication areas, movement from one set of communication areas to another set of communication areas, or a change of the desired services.

Once the subscriber unit has interpreted the particular condition, or the subscriber has not received new location update parameters, the process proceeds to step 154. At step 154, the subscriber unit monitors for at least one condition to occur. The process then proceeds to step 156 where the subscriber unit determines whether the condition has occurred. If not, the process reverts to step 150. If, however, the condition has occurred, the process proceeds to step 158 where the subscriber unit generates the location information, which identifies the particular communication area that the subscriber unit is located in. The location information is then sent to the mobility processor.

The preceding discussion has presented a method and apparatus for providing location information of subscriber units in a manner that substantially reduces communication system data traffic. This is achieved by providing location update parameters to the subscriber unit wherein the subscriber unit only provide its location information based on the location update parameters. In addition, a mobility processor stores the location information in a format convenient to the mobility processor. When a particular service processor requests location information of a particular subscriber unit, the mobility processor converts the information into a service dependent format corresponding to the format of the requesting service processor. This eliminates the one to one location updating of the service processors and thereby reduces the data traffic overhead of the communication system. In addition, users of subscriber units are provided with the flexibility of selecting the particular services they desire to access.

We claim:

1. In a communication system that includes a plurality of communication areas, a mobility processor and at least one communication device within the plurality of communication areas, a method comprising the steps of:

(a) selecting, by the communication device, one or more desired services;

(b) providing, from the mobility processor to the communication device, location update parameters identifying a condition when the communication device is to provide location information to the mobility processor, the condition being based at least in part on the desired services of the communication device; and (c) providing the location information, from the communication device to the mobility processor, based on the location update parameters.

2. The method of claim 1 wherein the condition is further based on a location of the communication device within a communication area of the plurality of communication areas, and service capabilities of the communication area.

3. The method of claim 2 further comprising:

(d) sending, from the communication device to the mobility processor, a message indicating a change in status in one or more of: the desired services of the communication device, the location of the communication device and the service capabilities of the communication area;

(e) determining, by the mobility processor, whether the change in status warrants a change in location update parameters; and (f) in response to a positive determination in step (e) providing, by the mobility processor to the communication device, new location update parameters identifying a second condition when the communication device is to provide location information to the mobility processor, the second condition being based on the change in status.

4. The method of claim 3 further comprising providing, by the communication device, location information of the communication device based on the new location update parameters.

5. The method of claim 2 wherein the condition is at least one of: a periodic interval, the communication device moving into another communication area of the plurality of communication areas, the communication device moving from one set of communication areas to another set of communication areas, and the communication device changing the desired services.

6. The method of claim 1 further comprising, within step (c), providing the location information by a plurality of subscriber units, wherein each of the plurality of subscriber units provides the location information based on group location update parameters.

7. The method of claim 1 wherein the step of providing the location update parameters is accomplished upon registration of communication device with the communication system.

8. A method for a subscriber unit to provide location information, the method comprises the steps of:

a) receiving, from time to time, location update parameters, wherein the location update parameters are based on desired services of the subscriber unit, location of the subscriber unit being within a communication area of a plurality of communication areas, and service capabilities of the communication area;

b) interpreting the location update parameters to ascertain at least one condition for providing the location information;

c) monitoring for the at least one condition to occur; and d) when the at least one condition occurs, generating the location information.

9. The method of claim 8 further comprises, within step (b), interpreting the at least one condition to be at least one of: expiration of a periodic interval, movement into another communication area of the plurality of communication areas, movement from one set of communication areas to another set of communication areas, and a change of the desired services.

10. In a communication system that includes a plurality of communication areas, a method for a mobility processor to process subscriber unit location updating, the method comprising the steps of:

a) providing location update parameters to a subscriber unit, the location update parameters identifying a condition when the subscriber unit is to provide location information to the mobility processor, the condition being based on location of the subscriber unit within a communication area of the plurality of communication areas, desired services of the subscriber unit, and service capabilities of the communication area;

b) receiving location information of the subscriber unit in a manner determined by the location update parameters; and c) receiving a message indicating a change in status in one or more of the location of the subscriber unit, the desired services of the subscriber unit, and service capabilities of the communication area, (1) determining whether the change in status warrants a change in location update parameters; and (2) in response to a positive determination in step (1) generating new location update parameters identifying a second condition when the communication device is to provide location information to the mobility processor, the second condition being based on the change in status.

11. The method of claim 10 further comprising providing the new location update parameters to the subscriber unit.

12. The method of claim 10 wherein, within step (c), the mobility processor receives a message indicating a change in status of the location of the subscriber unit, the message indicating the subscriber unit to be in another communication area of the plurality of communication areas, the another communication area having different service capabilities, with respect to the desired services, than the communication area.

13. The method of claim 10 wherein, within step (c), the mobility processor receives a message indicating a change in status of the service capabilities of the communication area.

14. The method of claim 10 wherein, within step (c), the mobility processor receives a message indicating a change in the desired services of the subscriber unit.

15. The method of claim 10 wherein, within step (c), the mobility processor receives a message indicating movement of the subscriber unit from one set of communication areas to another set of communication areas.

16. In a communication system that includes a plurality of communication areas, a method for subscriber unit location updating, the method comprising the steps of:

a) providing, by a mobility processor, location update parameters to a subscriber unit, wherein the location update parameters are based on location of the subscriber unit being within a communication area of the plurality of communication areas, desired services of the subscriber unit, and service capabilities of the communication area;

b) interpreting, by the subscriber unit, the location update parameters to ascertain at least one condition for providing the location information;

c) monitoring, by the subscriber unit, for the at least one condition to occur;

d) when the at least one condition occurs, providing, by the subscriber unit, the location information to the mobility processor; and e) receiving, by the mobility processor, the location information of the subscriber unit.

17. A subscriber unit comprising:

a radio frequency transceiver;

a processing unit operably coupled to the radio frequency transceiver; and a memory that is operably coupled to the processing unit, wherein the memory stores programming instructions that, when read by the processing unit, cause the processing unit to function as a receiver for receiving, from time to time, location update parameters, wherein the location parameters are based on desired services of the subscriber unit, location of the subscriber unit being within a communication area of a plurality of communication areas, and service capabilities of the communication area;

an interpreter for interpreting the location update parameters to ascertain at least one condition for providing the location information;

a monitor for monitoring when the at least one condition occurs; and a circuit for generating the location information when the at least one condition has occurred.

18. The subscriber unit of claim 17 further comprises, within the memory, programming instructions that, when read by the processing unit, cause the processing unit to function as the interpreter interpreting the condition to be at least one of: a periodic interval, movement into another communication area of the plurality of communication areas, movement from one set of communication areas to another set of communication areas, and changing of the desired services.

19. A mobility processor comprising:

an interface that receives location information from a subscriber unit and sends location update parameters to the subscriber unit, a processing unit operably coupled to the interface; and memory operably coupled to the processing unit, wherein the memory stores programming instructions that, when read by the processing unit, cause the processing unit to function as a generator for generating the location update parameters based on location of the subscriber unit within a communication area of a plurality of communication areas, desired services of the subscriber unit, and service capabilities of the communication area and, when the location information was received in a manner that is inconsistent with a manner corresponding to the location update parameters, generating second location update parameters.

20. The mobility processor of claim 19 further comprises, within the memory, programming instructions that, when read by the processing unit, cause the processing unit to function as a determiner that determines when the location information was received in the manner that is inconsistent with the manner corresponding to the location update parameters by determining when the location information indicates another communication area of the plurality of communication areas and the another communication areas has different service capabilities, with respect to the desired services, than the communication area.

21. The mobility processor of claim 19 further comprises, within the memory, programming instructions that, when read by the processing unit, cause the processing unit to function as a determiner that determines when the location information was received in the manner that is inconsistent with the manner corresponding to the location update parameters by determining when the service capabilities of the communication area have changed.

22. The mobility processor of claim 19 further comprises, within the memory, programming instructions that, when read by the processing unit, cause the processing unit to function as a determiner that determines when the location information was received in the manner that is inconsistent with the manner corresponding to the location update parameters by determining when the desired services have changed.

23. The mobility processor of claim 19 further comprises, within the memory, programming instructions that, when read by the processing unit, cause the processing unit to function as a determiner that determines when the location information was received in the manner that is inconsistent with the manner corresponding to the location update parameters by determining when the subscriber unit has moved from one set of communication areas to another set of communication areas.

24. The mobility processor of claim 19 further comprises, within the memory, programming instructions that, when read by the processing unit, cause the processing unit to function as the generator generating the second location update parameters to inform the subscriber unit not to provide the location information until the subscriber unit is located within a particular section of the communication system.

* * * * *

UNITED STATES PATENT AND TRADEMARK OFFICE
CERTIFICATE OF CORRECTION

PATENT NO. : 6,134,446
DATED : October 17, 2000
INVENTOR(S) : Sasuta, et al.

It is certified that error appears in the above-identified patent and that said Letters Patent is hereby corrected as shown below:

<u>Claim 7,</u>
Insert - - the - - before, "communication device"

Signed and Sealed this

Sixteenth Day of October, 2001

*Attest:*

*Attesting Officer*

NICHOLAS P. GODICI
*Acting Director of the United States Patent and Trademark Office*